Jan. 7, 1964 J. F. O'TOOLE 3,117,320

BUILT-IN ANTENNA REMOTELY POSITIONED WITH RESPECT TO WAVE-SIGNAL RECEIVER CABINET

Filed Aug. 14, 1961 2 Sheets-Sheet 1

INVENTOR
James F. O'Toole
BY John J. Pederson
ATTORNEY

Jan. 7, 1964 J. F. O'TOOLE 3,117,320

BUILT-IN ANTENNA REMOTELY POSITIONED WITH RESPECT TO WAVE-SIGNAL RECEIVER CABINET

Filed Aug. 14, 1961 2 Sheets-Sheet 2

INVENTOR
James F. O'Toole
BY John J. Pederson
ATTORNEY

United States Patent Office 3,117,320
Patented Jan. 7, 1964

3,117,320

BUILT-IN ANTENNA REMOTELY POSITIONED WITH RESPECT TO WAVE-SIGNAL RECEIVER CABINET

James F. O'Toole, Bellwood, Ill., assignor to Zenith Radio Corporation, a corporation of Delaware Filed Aug. 14, 1961, Ser. No. 131,339
2 Claims. (Cl. 343—702)

This invention relates to wave-signal receivers and more particularly to television receivers having built-in antennas which are adjustable by remote control.

Portable television receivers are a common electrical appliance in the American home of today. The portability of the instrument facilitates its use in a number of areas around the home and this flexibility of use greatly increases the utility of the television receiver. However, with such a receiver it is necessary to provide a built-in antenna which is commonly of the monopole or dipole type extending from the top of the cabinet but collapsible into the cabinet. Since the receiver is usually located in an enclosed room of an apartment building or house, the signal is generally attenuated and in addition it is distorted because of reflection from interior surfaces as compared to the signal received by a roof-top antenna. Therefore proper adjustment of the antenna for optimum reception is essential.

In adjusting the antenna two difficulties are encountered with prior art arrangements. In the first place, adjustment of the antenna must be made by the user physically holding the antenna and moving it until the picture is optimized. Since the body is at ground potential, it acts as a capacitor connected between the antenna and ground. This extra capacitance detunes the antenna, usually causing a poorer television picture and making adjustment of the antenna for optimized picture reproduction difficult. Additionally, since the built-in antenna is usually mounted on top of the portable television receiver, the user must stand in very close proximity to the receiver when adjusting it with his hand. Ideally, optimization of picture reproduction is achieved while viewing the screen at a normal distance.

As a solution to the above problem, it has been proposed, as disclosed and claimed in the copending application of Herbert H. Steglich, Serial No. 78,762, now abandoned, titled "Wave-Signal Receiver," and assigned to the present assignee, to provide an antenna installation for a portable television receiver which permits the user to optimize the picture without physically touching the antenna and at a distance from the television screen.

It is an object of this invention to provide a wave-signal receiver having an improved adjustable antenna.

It is a further object of the present invention to provide an improved adjustable antenna of the type claimed in the above Steglich application but which achieves a substantially greater range of antenna adjustment, thus achieving better picture optimization both for a given installation and several different installations having varying reception characteristics.

Accordingly, the invention contemplates a wave-signal receiver comprising a cabinet containing a receiver chassis having the customary wave-signal receiving circuits. An antenna having a predetermined directional pattern is coupled to the receiving circuits. Means for mounting the antenna on the cabinet are provided to permit adjustment of the position of the antenna relative to the top surface of the cabinet and to permit retraction of the antenna into the cabinet where it has a predetermined orientation with respect to the cabinet. A driving system is mechanically coupled to the antenna for selectively rotating the antenna to describe a predetermined surface of revolution to adjust the orientation of the directional pattern. Means are also provided for varying the configuration of the surface from a right angle conical surface to a plurality of eccentric conical surfaces and vice versa. Electrically operated driving means are coupled to the driving system to actuate it. Finally, control means are provided for energizing and de-energizing the driving means for positioning the antenna at any selected location in its surface of revolution.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 2:
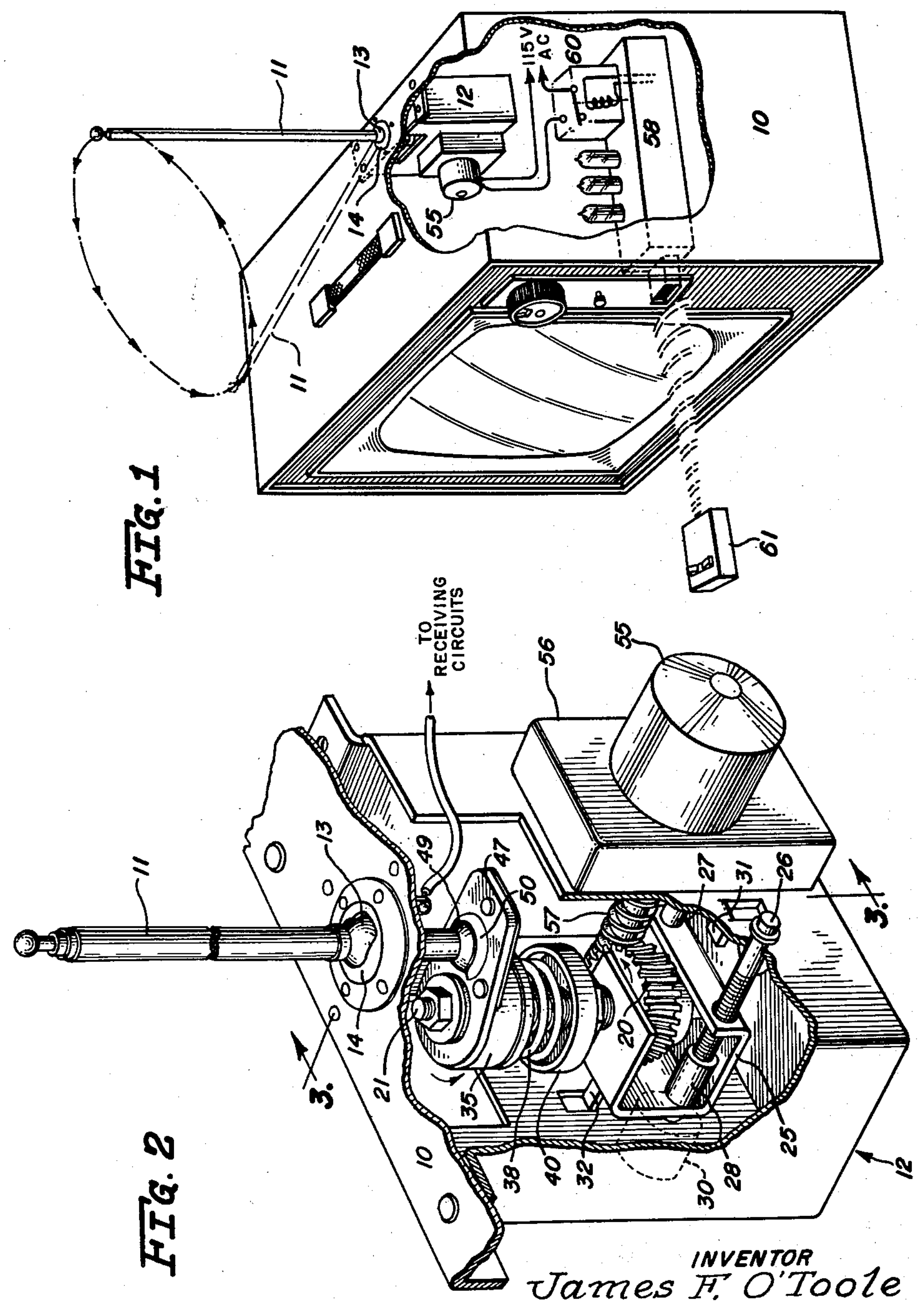
FIGURE 1 is a perspective view of a television receiver with a cut-away portion showing the claimed invention.
FIGURE 2 is a perspective view showing a part of the cut-away portion of FIGURE 1 in greater detail.

Referring now more particularly to FIGURE 1, the television receiver there shown comprises a cabinet 10. Cabinet 10 contains a receiver chassis (not shown) having wave-signal receiving circuits which are coupled to an antenna 11 mounted to extend through the top surface of the cabinet. Antenna 11 is of the monopole type and has a directional pattern shaped like a donut with the antenna conductor extending through its center. Of course, since the antenna is mounted on the top of cabinet 10 and is placed near ground, this pattern will be distorted somewhat from its theoretical shape. A supporting structure or housing 12 is fastened to cabinet 10 beneath the top surface thereof and supports a driving system for moving antenna 11.

Figures 3, 4:
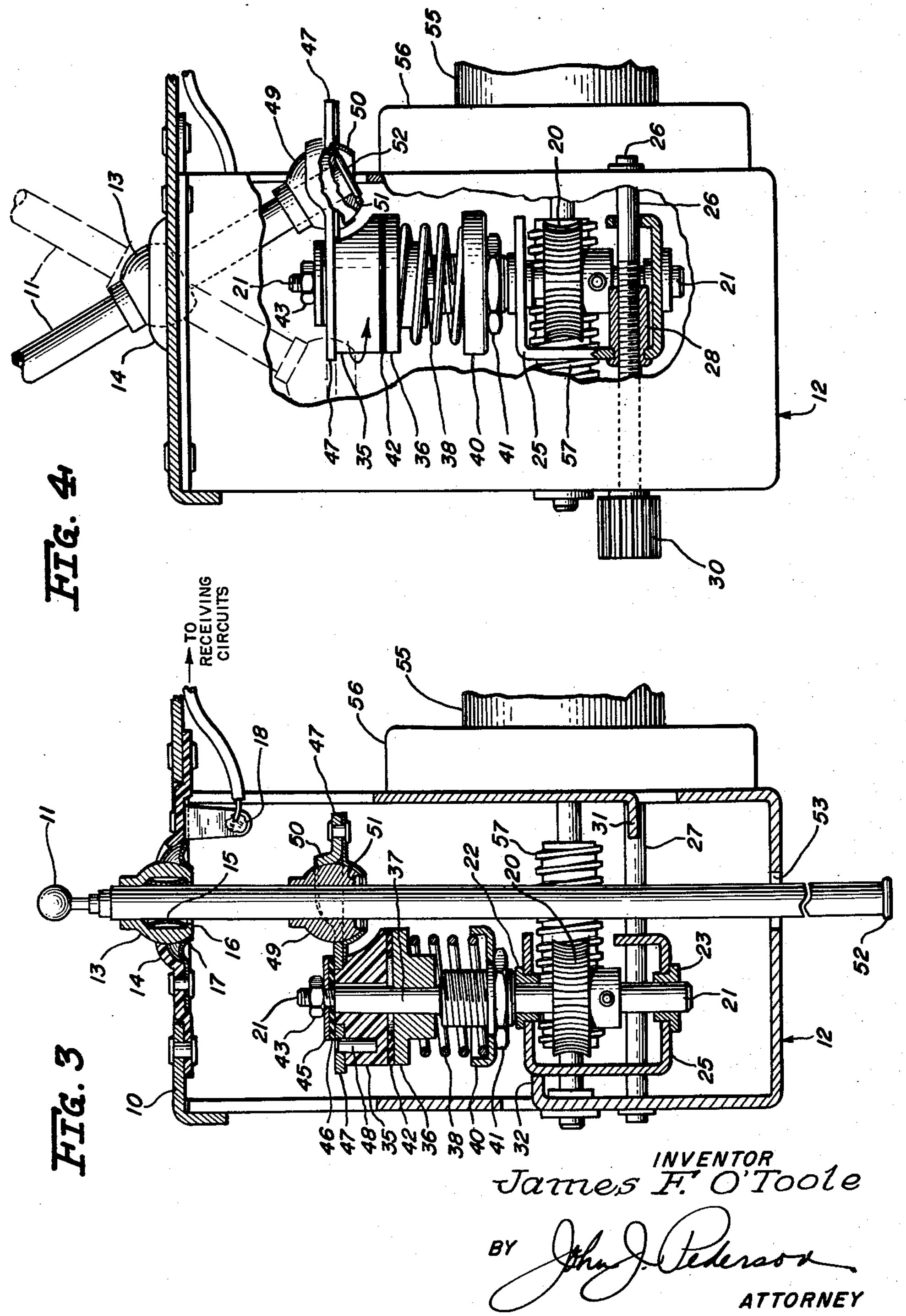
FIGURE 3 is a sectional view of FIGURE 2 taken along line 3—3.
FIGURE 4 is an elevational view of FIGURE 2 showing an alternative operating position.

Referring now to FIGURES 2 and 3, the mount for antenna 11 comprises a ball 13 received in a socket 14 affixed to cabinet 10. Socket 14 is constructed of an insulating material, such as styrene plastic, to insulate antenna 11 from cabinet 10. The ball and socket joint 13, 14 permits adjustment of the position of the antenna to almost any angular position relative to the top surface of the cabinet. Antenna 11 is frictionally held in ball 13 by leaf springs 15 and 16, as best shown in FIGURE 3, allowing the antenna to slide up and down in the ball. A conductive spring 17 of circular configuration is attached to socket 14 and wipes against ball 13 to establish electrical contact with antenna 11. A terminal 18 attached to conductor 17 connects to the receiving circuits (not shown) of the receiver.

A driving system is mechanically coupled to antenna 11 for selectively moving it to adjust the angular orientation of its directional pattern. Specifically, the driving system comprises a worm wheel 20 which is keyed to a shaft 21 journalled in bearings 22 and 23 mounted on a carriage 25. Carriage 25 is movably mounted on two rods or shafts 26 and 27, shaft 26 being threaded and being rotatably mounted in two opposed side walls of housing 12 and shaft 27 being mounted in the same two walls. Shaft 26 is threaded through a nut 28 which is affixed to carriage 25. Rotation of shaft 26 by means of an adjustment knob 30 which is fixed on the end of shaft 26 projecting through the rear wall of cabinet 10, as best shown in FIGURE 4, moves the carriage along shafts 26 and 27 in a horizontal direction depending upon which way knob 30 is rotated. Referring specifically to FIGURE 3 movement of carriage 25 toward the right is limited by a stop abutment 31 struck out from one side of housing 12 and similarly movement of carriage 25 toward the left is limited by a stop abutment 32 which is struck out from the opposing wall of the housing.

A disc 35 is mounted for rotation on shaft 21, being coupled to the shaft by clutch means to be described hereafter. A clutch plate 36 is keyed to a D-shaped portion 37 of the shaft 21 and is biased against disc 35 by a pressure spring 38 which is concentric with shaft 21. One end of spring 38 rests against clutch plate 36 and the other end is retained by a spring retainer cup 40 mounted on shaft 21. Cup 40 is held against movement by a nut 41 threaded on shaft 21; rotation of the nut adjusts the pressure of clutch plate 36 against disc 35. A rubber washer 42 is inserted between disc 35 and clutch plate 36 to provide a relatively high coefficient of friction between the disc and the plate. Disc 35 is retained on shaft 21 against the upward biasing force of spring 38 and clutch plate 36 by a retaining nut 43 which is threaded on the end of shaft 21. A metal washer 45 and an insulating washer 46 are inserted between nut 43 and disc 35. An arm 47 is keyed to disc 35 by a pin 48 to rotate about shaft 21 and is locked in position against the disc by nut 43 and washers 45 and 46.

The driving system described above is mechanically coupled to antenna 11 by another ball and socket joint 49, 50. The ball element 49 is centrally apertured to permit antenna 11 to slide therethrough and is mounted in a socket 50 carried on arm 47 in eccentric relation to shaft 21. Ball 49 includes a recess 51 which is dimensioned to receive a rim flange 52 on the lower extremity of antenna 11 to prevent the antenna from being pulled through the ball. A hole 53 is provided in the bottom of housing 12 through which antenna 11 may project when it is collapsed into the cabinet as shown in FIGURE 3. The antenna must be in a vertical position before it can recede into the cabinet because, as shown in FIGURE 4, socket 50 will arrest any downward movement of the antenna unless it is in the vertical position shown in FIGURES 2 and 3.

Electrically operated driving means are coupled to the antenna driving system and comprise a motor 55 and reduction gearing 56 which drive a worm shaft 57 journalled in housing 12. Worm 57 meshes with worm wheel 20 to drive the worm wheel in a counterclockwise direction as shown in FIGURE 2.

The driving motor is energized and de-energized by a wireless remote control system shown in FIGURE 1 including a control chassis 58 having a bi-stable relay 60 which is actuated by control signals issued from an ultrasonic transmitter 61. The movable element of bi-stable relay 60 is in series with a power lead to motor 55. Successive actuation of transmitter 61 by the user of the television receiver generates control signals which cause the bi-stable relay to open and close thus de-energizing and energizing drive motor 55. A suitable type of remote control system is disclosed and claimed in Patent No. 2,817,025 granted to Robert Adler on December 17, 1957, and assigned to the same assignee as the present application.

*Operation*

Antenna 11 in its storage position is substantially collapsed into cabinet 10 as shown in FIGURE 3. Rotation of the antenna is not possible with its lower end extending down through hole 53 in the bottom of housing 12. If the user should accidentally energize motor 55, the driving system is prevented from stalling by slippage between clutch plate 36 and disc 35.

To place the antenna in an operable position the user pulls the antenna upward from the cabinet to place rim flange 52 in recess 51 of socket 49.

In carrying out the objectives of the invention the user may now rotate the antenna and in addition vary the configuration of the surface of revolution which the antenna describes while rotating. Thus the angle the antenna forms with the top surface of the cabinet or ground and its compass direction may be adjusted. Picture optimization of a television receiver generally includes two significant factors. First the antenna must generate a signal voltage in response to a transmitted signal. To accomplish this there must be some coherence in the polarization of the transmitted signal and the receiving antenna. In the specific case of a television signal which is horizontally polarized and a monopole antenna which is vertically polarized when normal to the ground, the antenna must usually be slanted in order to provide signal voltage. Therefore the ability to vary the angle the antenna makes with ground is important in picture optimization.

A second factor in antenna adjustment is the positioning of the directional pattern of the antenna to produce the ideal signal voltage. Since the built-in antenna of a portable television receiver is usually located in a room of a house or apartment the signal may be reflected off or be deflected by many surfaces before it reaches the antenna. Reflected signals cause ghosts and many other types of picture distortion. However the directional pattern of the antenna can be oriented to eliminate most of these distortion causing signals and to receive a signal which is substantially distortion free.

The antenna is rotated by the actuation of transmitter 61 to energize motor 55. If carriage 25 is in the position shown in FIGURE 2 abutting stop 32, antenna 11 rotates to describe an eccentric conical surface as shown in FIGURE 1. The user allows the antenna to rotate until he sees the optimum picture on his television screen and then actuates transmitter 61 a second time to de-energize motor 65 and stop the antenna at the selected position. If, while the antenna is rotating its movement is arrested by some obstruction, clutch 35, 36, 42 allows the motor to continue to rotate.

The configuration of the conical surface of revolution described by the antenna may be varied by the rotation of knob 30 which moves carriage 25. Movement of carriage 25 changes the relationship of the axis of shaft 21 with the center of ball 13. In FIGURES 1, 2 and 3 the axis of the shaft is offset its greatest distance from ball 13. In FIGURE 4 the axis of shaft 21 coincides with the center of socket 13. In this position rotation of arm 47 causes antenna 11 to describe a right angle conical surface. Any displacement of carriage 25 from this position places an offset between shaft 21 and ball 13. Rotation of antenna 11 with the offset causes the antenna to describe an eccentric conical surface since the apex of the cone represented by ball 13 is offset from the center of revolution of the base represented by arm 47. Thus the configuration of the surface of revolution described by antenna 11 may be varied from a right angle conical surface to a plurality of conical surfaces and vice versa by adjustment of the position of carriage 25 between its two limit positions.

The ability to vary the configuration of the surface of revolution that the antenna describes is advantageous to the user in two respects: (1) placement of the television receiver in the user's home, for example, against a wall, is facilitated by the eccenrtic conical pattern shown in FIGURE 1 in which the antenna's path of motion does not extend beyond the rear of the television receiver. Thus the antenna may be rotated a complete revolution without danger of hitting an obstruction; (2) the number of potential antenna positions is increased thereby making possible better picture optimization.

When the user wishes to collapse the atnenna into the cabinet he manipulates knob 30 to move carriage 25 against abutment 32, as shown in FIGURE 3, in order to place the antenna in a vertical position over hole 53. With the antenna in this position the user may collapse the antenna into the cabinet.

The invention as described provides a built-in antenna which retains the advantages of the above-mentioned Steglich device in permitting the user to optimize his television picture without physically touching the antenna and at a distance from the television screen but which achieves a substantially greater range of antenna adjustment.

While a particular embodiment of this invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A wave-signal receiver comprising: a cabinet containing a receiver chassis having wave-signal receiving circuits; an antenna having a predetermined directional pattern coupled to said receiving circuits; means for mounting said antenna on said cabinet to permit adjustment of the position of said antenna relative to the top surface of the cabinet and to permit retraction of said antenna into said cabinet when said antenna has a predetermined orientation with respect to said cabinet; a driving system mechanically coupled to said antenna for selectively rotating the antenna to describe a predetermined surface of revolution to adjust the orientation of said directional pattern; means for varying the configuration of said surface from a right angle conical surface to a plurality of eccentric conical surfaces and vice versa; electrically operated driving means coupled to said driving system to actuate such system; and control means for energizing and de-energizing said driving means for positioning said antenna at any selected location in said surface of revolution.

2. A wave-signal receiver comprising: a cabinet containing a receiver chassis having wave-signal receiving circuits; an antenna having a predetermined directional pattern coupled to said receiving circuits; means for mounting said antenna on said cabinet including a ball and socket joint in which the antenna is slidable to permit adjustment of the position of said antenna relative to the top surface of the cabinet and to permit retraction of said antenna into said cabinet when said antenna has a predetermined orientation with respect to said cabinet; a driving system coupled to said antenna by a second ball and socket joint, said second joint being rotatable about an axis of revolution in a predetermined plane for selectively moving the antenna to describe a surface of revolution to adjust the orientation of said directional pattern; means for moving said axis of revolution in a plane normal to said predetermined plane to vary the configuration of said surface of revolution; electrically operated driving means coupled to said driving system to actuate such system; and control means responsive to a signal received from a remote point for energizing and de-energizing said driving means for positioning said antenna at any selected location in said surface of revolution.

References Cited in the file of this patent

UNITED STATES PATENTS

| | | |
|---|---|---|
| 2,541,030 | Busignies | Feb. 13, 1951 |
| 2,574,376 | Childs et al. | Nov. 6, 1951 |
| 2,847,627 | Lieberman | Aug. 12, 1958 |
| 2,895,130 | Klancnik | July 14, 1959 |
| 2,934,764 | Noll et al. | Apr. 26, 1960 |
| 2,945,229 | Kaluser | July 12, 1960 |
| 3,041,609 | Rathenon | June 26, 1962 |